Figure 1:
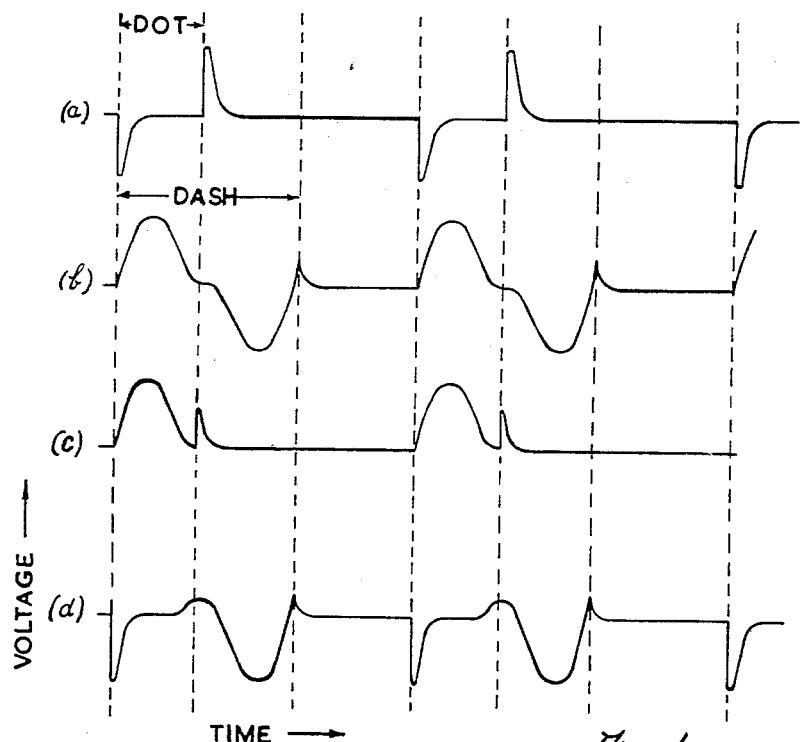

Dec. 20, 1955  F. C. WILLIAMS ET AL  2,727,988
ELECTRICAL SIGNAL DETECTING AND AMPLIFYING SYSTEMS
Filed July 25, 1950  3 Sheets-Sheet 1

F. C. Williams
T. Kilburn
Inventors

By— Moore and Hall
Attorneys

F. C. Williams
T. Kilburn
Inventors

United States Patent Office 2,727,988
Patented Dec. 20, 1955

2,727,988

ELECTRICAL SIGNAL DETECTING AND AMPLIFYING SYSTEMS

Frederic C. Williams, Timperley, and Tom Kilburn, Northfield, Dewsbury, England, assignors to National Research Development Corporation, London, England Application July 25, 1950, Serial No. 175,794

Claims priority, application Great Britain August 8, 1949

12 Claims. (Cl. 250—27)

This invention relates to electrical signal detecting and amplifying systems for the detection or evaluation of physical quantities, such as an electrostatic charge, which are caused to give rise to electric pulse signals of a sense dependent upon the sense of the change of the quantity being detected or evaluated. The invention is particularly, but not exclusively, concerned with the signal detecting and amplifying system for use with the electrostatic digital storage systems described in U. S. Patent Applications Serial Nos. 790,879 filed December 10, 1947, of Frederic C. Williams, 50,136 filed September 20, 1948, of Frederic C. Williams and Tom Kilburn, and 124,192 filed October 28, 1949, of Frederic C. Williams and Tom Kilburn, and which for simplicity will be referred to hereafter as electrostatic storage systems.

In the digital storage systems described in the patent specifications referred to and also in a Paper entitled "A Storage System for Use With Binary-Digital Computing Machines" by F. C. Williams and T. Kilburn in the Proceedings of the Institute of Electrical Engineers, part III, No. 40, March 1949, at pages 81-100, different items of digital data are characterised by different conditions of charge of discrete areas or elements of an insulating recording surface upon a screen within a cathode ray tube. When each such element of the storage surface is irradiated by an electron beam of suitable velocity an electrostatic charge is created (or destroyed) upon the element, the sign of the change in charge being dependent upon the previous charge condition of the storage element and thus upon the significance of the digit recorded thereon. The changes of charge give rise to corresponding currents flowing to a signal plate, which is capacitively coupled to the recording surface, and information extracted from the signal plate current is used to reconstitute in dynamic form the stored digits and to enable the stored data to be regenerated or replaced (written over) by new data derived from the original data or otherwise.

The usual method of detecting such signal plate currents in an electrostatic storage system depends upon causing the currents to flow through a suitable load impedance to produce a voltage which may be amplified in conventional fashion. In the system described in the Paper referred to above, a thermionic valve amplifier is provided with feedback in such a fashion that the input impedance of the amplifier is effectively a resistance of 1000 ohms and the voltage developed across this input impedance by the current flowing to or from the directly-connected signal plate is amplified. It will be appreciated that such a method of detecting states of charge or other physical condition to produce corresponding electrical signals for amplification is essentially a differentiating process and that what is measured is not a quantity proportional to a charge or similar quantity $q$ but a quantity proportional to the rate of change of $q$ with respect to time.

In a practical application of the electrostatic digital storage system, operating in the manner outlined above, each digit period may be of the order of 8 microseconds and each digit location on the cathode ray tube screen surface (such digit location corresponding to the element previously referred to) is irradiated or explored by switching the cathode ray beam on at the appropriate location for an interval of approximately 1 microsecond, this interval being adequate to ensure that a reasonably stable charge condition is attained at the digit location. The initial transient current which flows in the signal plate circuit during the interval of beam turn on is positive or negative in dependence upon the original state of charge of the explored spot and thus identifies the significance ("0" or "1") of the digit recorded at that location. The amplified signal plate current waveform is fed to a gate circuit, where by means of a strobe waveform, that portion of the waveform occurring during the critical part of each 8 microsecond digit period is examined and the gate circuit provides signals which are representative of the "0" or "1" significance and which provide the necessary waveforms for regenerating (or replacing) the recorded digital data. In the systems described the strobe waveform comprises a pulse which selects the amplifier output wave during the period while the beam is switched on and is therefore approximately 1 microsecond in duration. The strobe pulse is made wide as there is uncertainty as to the precise timing within each digit period of the peak of the signal produced by the 1 microsecond exploring beam. In general a store will comprise a number of cathode ray tubes each with its own amplifier and gate circuit while the basic operating waveforms, deflecting waves, digit pulse waves and strobe pulse waves, etc. will be supplied to all units from common sources. Variations in amplifier responses and other circuit delays may thus cause considerable variation in the relative timing of the peaks of the signal waveforms fed to the various gate circuits.

The use of a relatively wide strobe pulse for the examination of such a signal, particularly when the information to be derived is of a discontinuous character (indicative of "0" or "1" in the case considered), is undesirable as it provides opportunity for spurious signals and peaks of noise to inject wrong information into the system. The optimum mode of operation would be one in which the investigation of the original data (charge or other physical quantity) took place in as short a time interval as possible consistent with the derivation of the required information from any element of the data, and it is the principal object of the present invention to provide an electric signal detecting and amplifying system for developing electric signals dependent upon the sense of electric pulses in which this ideal mode of operation can be more closely approached.

In accordance with the invention this object is attained by providing an integrating circuit having a time constant longer than the duration of any of the pulses and having the pulses applied to its input terminals and means for selecting from the output of the integrating circuit portions of duration smaller than that of any of said pulses and occurring when the said output has reached substantially its peak amplitudes. An "integrating circuit," as is known, and as the term is used herein, is a circuit which includes as one feature thereof the production of an output whose amplitude is dependent upon the energy and sense of a signal applied to its input. The integrating circuit may be conveniently provided by modifying the amplifier so that the input circuit has a suitable long time constant instead of the short time constant required for the correct operation of systems of the type previously described.

The circuit according to the invention may be arranged to carry out the selection only from signals at the output of the integrating circuit which are in one predetermined sense. For instance in electrostatic storage systems such as are described in the patent specifications and Paper previously referred to, it is arranged that one condition of charge, usually a dot, is automatically regenerated in the absence of any applied control and only for regeneration of a dash is it required to apply a control voltage. In such cases, therefore, it is only required to detect with certainty the presence or absence of pulses generated at the signal plate in a sense corresponding to a dash.

In the signal detecting and amplifying channel of an electrostatic digital storage system employed to record binary-digital data, the voltage waveforms to be amplified when the stored information is being regenerated are symmetrical or balanced, with respect to the rest level occurring between signals, that is they contain no direct components. This may be seen from Figure 1($a$) and ($b$) of the drawing which show the amplifier waveforms corresponding to regeneration of dots and dashes respectively in a system such as that described in the above-identified U. S. Pat. application Serial No. 50,136 filed September 20, 1948. The amplifier waveforms obtained for regeneration of either of the two recorded states in any of the other modes of storage described in the specifications referred to will similarly be balanced. However, when computation is occurring in a system utilising such a store, or when new information is being written into the store, regeneration may be replaced by the writing into a particular storage location of an item of digital information differing from that already existing therein. For example a dot may be replaced by a dash or a dash may be replaced by a dot. During such an operation the amplifier waveform will not be balanced with respect to the rest level. This is made clear by the waveforms of Figure 1($c$) and ($d$) of the accompanying drawings which indicate respectively the amplifier waveforms arising for the writing of dots upon dashes and dashes upon dots. The occurrence of such unbalanced waveforms, with an A. C. coupled amplifier, causes the resting voltage level of the output signals to be shifted. This is an undesirable result as the circuits controlled by the gated sample of the amplified waveform are operated on the attainment of a predetermined amplitude level and it becomes necessary to provide a large standing bias on the grid of the first valve to which the gated signal is applied with the result that an otherwise usable range of output voltage of the amplifier, equal to the peak-to-peak variation which is to be expected in the resting output signal voltage level, is lost.

A further disadvantage which may arise in an amplifying system is interference by low-frequency noise and microphony arising within the amplifier. In the amplifier described in the Paper referred to above the effects of such interference is minimised by the application of negative feedback but such an expedient is not convenient if the amplifier is modified to provide the required integrating characteristic. It is a further object of the invention therefore to provide means, in an electrical signal detecting and amplifying system of the kind referred to, which prevents shifting of the resting level of the amplified signal produced in response to an unbalanced input signal and which also reduces low-frequency components in the amplifier output signal.

In accordance with a feature of the invention this further object is achieved by providing in or in association with the amplifying channel means which serve to maintain the rest level of the output from the integrating circuit at a substantially constant value. These means may take a variety of forms. Conveniently they may comprise a short-circuited delay network or similar pulse-producing circuit embodied in the amplifier to render the waveform balanced or they may comprise an electronic clamping circuit which periodically releases the amplifier output under the control of an unclamping or strobe pulse.

Figure 2:
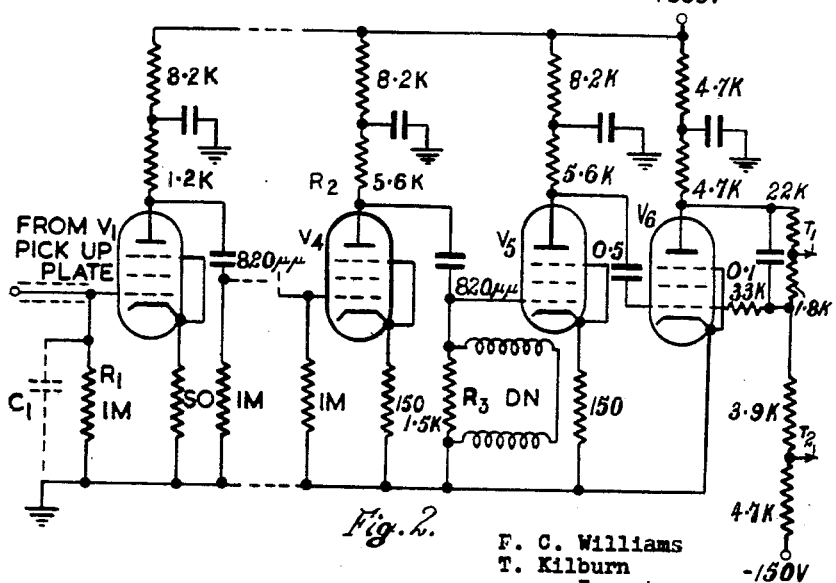
Figure 3:
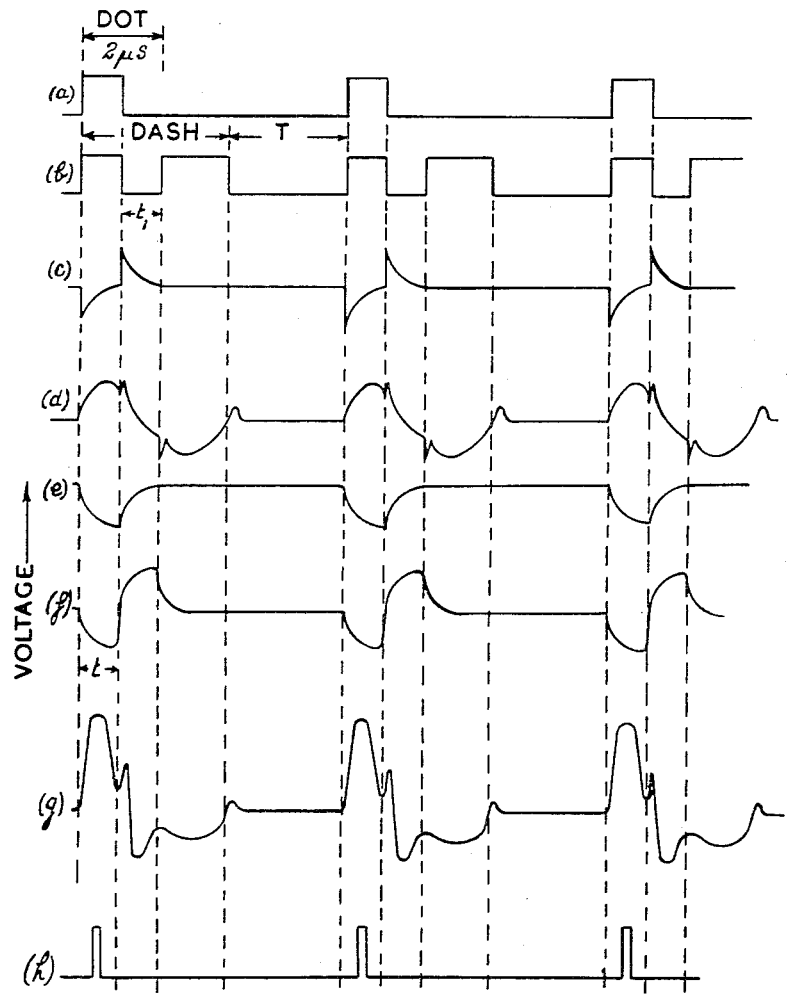
Figure 4:
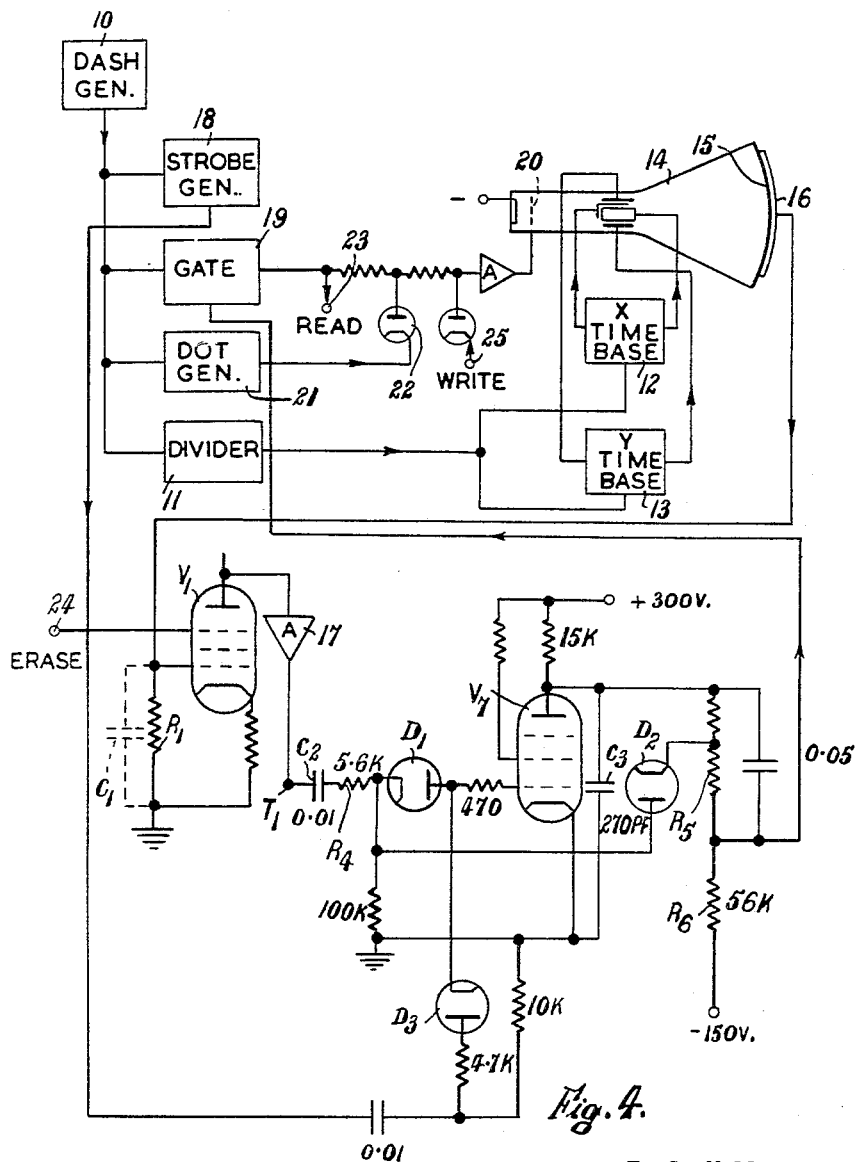

The nature of the invention in certain aspects thereof will be more clearly understood from the following description given with reference to the accompanying drawings, in which Figure 1 shows certain wave forms as mentioned above, Figure 2 is a circuit diagram of an amplifier according to the invention, Figure 3 contains waveforms illustrating the operation of the invention, and Figure 4 is a circuit diagram showing partly in block form essential parts of an electronic storage system embodying the invention.

Referring to Figure 2, the amplifier, which is a modified version of the amplifier described in the Paper by Williams and Kilburn referred to above, comprises six capacity-coupled valve stages $V_1$—$V_6$, the last being an anode follower stage which provides outputs at $T_1$ and $T_2$ at two suitable D. C. levels. The valves $V_2$ and $V_3$ and their associated circuit elements have been omitted for the sake of simplicity. The negative feedback provided over the first three stages of the amplifier described in the Paper is omitted so that the input impedance of the amplifier is substantially the high resistance (1 megohm) grid leak $R_1$ parallelled by a capacity $C_1$ which may be conveniently provided by strays.

The advantages of negative feedback may be obtained, if required, by the provision of degenerative cathode impedances in appropriate stages. The circuit $C_1R_1$ acts as an integrating circuit. The anode load of the fourth stage $V_4$ is provided, not by a simple resistor but by a delay network DN which is terminated at its input end by its characteristic impedance formed by the parallel combination of resistors $R_2$ and $R_3$, and it is short-circuited at its remote end. The network load is capacitively coupled to the anode of $V_4$ and the voltage across the input of the network is applied to the grid of the fifth stage $V_5$. The electrical length of the delay network and its location in the amplifier will depend upon the characteristics of the amplifier input signals. In the electrostatic storage case considered, in which each usable item of data is derived within a one-microsecond interval and in which items of information recur at approximately 8-microsecond intervals, it is apparent that if the total delay time, from the input back to the input, through the network is made equal or approximately equal to 1 microsecond, the amplifier output waveform will be balanced irrespective of whether the input wave is balanced or not, while the initial microsecond of the output wave in each digit period will still contain a true indication of the nature of the charge condition of the corresponding portion of the cathode ray tube screen surface. The delay network should be located at such a point in the amplifier that there is no danger of preceding stages overloading due to shift of the mean or resting level of the signal produced by unbalanced input waveforms. This implies that the delay network should be placed earlier in the amplifier chain than the point at which, having regard to the time constant of the amplifier input circuit and the repetition period of the applied signals, a succession of like unbalanced input signals would produce an appreciable shift in the rest potential of the control grid of the succeeding valve.

The behaviour of the system may be understood by reference to Figure 3. Figures 3($a$) and 3($b$) show the bright-up waveforms which may be applied to the control grid of the cathode ray tube for the regeneration of a succession of dots and dashes respectively, the "meditation," pulse described in U. S. patent application of Frederic C. Williams and Tom Kilburn, Serial No. 165,262 filed May 31, 1950 being employed during the time $t_1$ (Figure 3($b$)) to black out the latter portion of the normal dot period. The corresponding amplifier output waveforms which would exist if the input time constant of the amplifier was low and no delay network was incorporated are indicated approximately in Figures 3($c$) and 3($d$). Now with the amplifier arranged as indicated in Figure 2 the time constant ($C_1R_1$) of the grid circuit of the first stage may be of the order of 20 microseconds so that under these conditions the amplifier input waveform (which is of the same shape as that of the wave applied to the delay network DN) will, for the regeneration of a dot, be as indicated in Figure 3(e) and will be the approximate integral of the wave of Figure 3(c). The wave corresponding to the regeneration of a dash is not shown but will be the approximate integral of the wave of Figure 3(d) while the amplifier waveforms corresponding to the writing of a dot on a dash or a dash on a dot may be similarly derived from the waveforms of Figures 1(c) and 1(d). The modifications required to the waveforms of Figures 1(c) and 1(d) to take account of operation with a "meditation" pulse will be obvious. The actual forms of these integrated waves are not indicated in Figure 3 for reasons of simplicity, but it is obvious that in the cases of the unbalanced dot-on-dash and dash-on-dot waves the integrated waves will not return to the datum level.

The effect of the delay network upon the amplifier waveforms may now be considered. The wave of Figure 3(e) when applied to the input of the delay network DN is propagated through the network and undergoes reflection with reversal of phase at the short-circuited end so that a cancelling wave is propagated back through the network. The resultant wave at the input end of the network, in the particular case in which the total time delay $t$ is approximately equal to 1 microsecond, will be somewhat as indicated in Figure 3(f). It is obvious that this waveform is truly balanced and that also, irrespective of the balanced or unbalanced nature or the duration of an applied wave, the delay network will produce a waveform which is essentially balanced.

When the dash waveform shown in Figure 3(d) is applied to the input of the amplifier the output of the amplifier, owing to integration and the effect of the delay network, is somewhat as shown in Figure 3(g).

A suitable strobe pulse waveform, indicated in Figure 3(h) and comprising very narrow strobe pulses, of the order of $\frac{1}{10}$ microsecond duration, may be employed to examine the amplifier output waveform in any suitable known form of gate circuit. The strobe pulse is preferably timed to occur near the end of the initial period of each digit interval during which the integrated signal is built up so that the strobed portion of the waveform has an amplitude substantially equal to the maximum value of the integrated signal. The use of the very narrow strobe pulse will confer upon the system the greatly improved signal-to-noise ratio arising from the fact that the chance of an interfering pulse signal falling within the strobe period is much less than the chance of such a signal falling within the much wider (1 microsecond) strobe pulse period which would be required if the integration process were not utilised.

An upper limit is imposed upon the permissible time delay of the network DN when the input data fed to the amplifier is of a repetitive character as in the case of the digital electrostatic store. If input signals are recurrent as indicated in Figure 3 then the total time delay $t$ of the network must be less than the time interval $T$ which occurs between the beginning of the signal in any one digit period and the trailing edge of the longest signal which may occur during the preceding digit period.

With a short delay time $t$ of the order of 1 microsecond there is no danger of overlap between the signals in adjacent digit intervals in the electrostatic storage system referred to as a gap of several microseconds exists between the trailing edge of a dash pulse and the commencement of the next dot or dash pulse.

A further effect of the delay network arises from the fact that the operation of the network, when a short delay time of the order of 1 microsecond is employed, is substantially the same as the operation of a differentiating circuit. Low-frequency components in the signals passing through the amplifier, such as low-frequency noise and microphony which tend to become large due to the removal of the negative feed-back applied to the amplifier in the system described in the Paper referred to, will thus be substantially removed.

In an alternative form of the invention the amplifier is modified to provide the integrating function, as in Figure 2, but the delay network is omitted, the load of the valve $V_4$ being provided by a simple resistor. The amplifier output waveform is then fed to its destination through a clamping circuit arrangement which clamps the output signal at a datum level at all times except for the durations of unclamping or strobe pulses. The unclamping operation may be conveniently combined with the strobing operation which is required to perform the periodical examination of the output signal, and when the invention is applied to an electrostatic store the unclamping and strobing function may be performed by the so-called gate circuit which forms an essential element in the operation of such a store.

An example of such arrangement will be described with reference to Figure 4 which also shows, largely in block form, the general arrangement of an electrostatic storage system.

A pulse generator 10, which in this example generates dash pulses, applies pulses to a divider 11 to produce pulses of suitable lower recurrence frequency to synchronise the X and Y time bases 12 and 13 of a cathode ray tube 14. The electrostatic charges are assumed to be stored upon the phosphor screen deposited on the end wall 15 of the tube and a signal or pick-up plate 16 is provided on the outside of this wall.

The valve $V_1$ is the first valve of the amplifier of Figure 2 and is associated, as in Figure 2, with an integrating circuit $C_1R_1$. The other valves of the amplifier are omitted for simplicity, but are represented by an amplifier 17. One of the output terminals, say $T_1$, of Figure 2 is connected through a condenser $C_2$, resistor $R_4$ and a diode $D_1$ to the control grid of a valve $V_7$. The pulses at terminal $T_1$ are arranged, by suitable choice of the number of stages in amplifier 17, to be negative-going in response to the exploration of a dash form of charge on the screen 15. A valve $V_7$ is arranged to be normally clamped in the conducting condition by the diodes $D_1$, $D_2$ and $D_3$ which are held conducting by the positive-going part of a strobe waveform, such as that indicated in Figure 3(g) but of reversed sense so that the strobe or unclamping pulses are negative-going. The strobe waveform is generated by a strobe pulse generator 18 under the control of pulses from generator 19 and is applied to the anode of $D_3$. If a voltage from the amplifier 17 having an initial negative-going portion resulting from the exploration of a dash is fed to the terminal $T_1$ during a strobe pulse when the valve $V_7$ is unclamped, this valve is cut off and the condenser $C_3$ charges up, to be discharged again when the unclamped period ends. A positive-going saw-tooth waveform is thus generated for each negative-going signal from the amplifier 17 and this waveform has at the junction of resistors $R_5$ and $R_6$ a resting level of approximately $-10$ volts. This waveform is applied as a gating pulse to a gate circuit 19, to open the gate and allow dash pulses from generator 10 to pass to the control electrode 20 of tube 14.

Dot pulses from a generator 21, under the control of the generator 10, are applied through a diode 22 to the control electrode 20 and in the absence of gating pulses applied to gate 19 dots are recorded upon the screen 15. Wherever a gating pulse is applied to gate 19, the dots upon the screen are extended to dashes. In this way the charge pattern upon screen 15 is regenerated.

Information can be read from the store, for example at terminal 23. New information can be written into the store, for example by applying a suitable negative voltage as erasing voltage to terminal 24 to hold the valve $V_1$ cut off (and thus prevent regeneration of dashes) and applying a suitable positive-going dash voltage at terminal 25 to convert dots to dashes where appropriate. When this has been done the erasing voltage is removed from terminal 24.

The clamping circuit arrangement does not need to be as compelx or as specialised as that shown in Figure 4. Any known clamping circuit, such as the well-known double diode or double triode or pentode clamp circuits may be employed. Examples of such clamping circuits are given in a Paper entitled "Introduction to circuit techniques for radiolocation" by F. C. Williams in the Proceedings of the Institute of Electrical Engineers, part IIIA, No. 1, 1946, pages 298 and 299, Figures 18 and 22. These circuits normally maintain an output point at a fixed steady potential except for the duration of an unclamping pulse which renders the clamping valves nonconducting. The previously clamped output point is thus permitted to assume, for the duration of the unclamping pulse the potential applied to a signal input point. Such circuits have the advantage that they may be adapted to pass signals of either polarity when unclamped.

We claim:

1. A circuit for developing electric signals dependent upon the sense of electric pulses comprising an integrating circuit having a time constant longer than the duration of any of said pulses, means to apply said pulses to the input of said integrating circuit to generate at the output of said integrating circuit an integrated signal comprising integrated waveforms corresponding to said pulses separated by rest periods, stabilising means to maintain the amplitude of said rest periods substantially constant, and means following said stabilising means to select from said integrated waveforms portions thereof of duration smaller than that of any of said pulses.

2. A circuit according to claim 1, wherein said stabilising means comprise a reflecting delay network having a delay time, from input back to input, less than the minimum intervals between said pulses, for reflecting to the input of said network a delayed integrated signal to combine with said integrated signal in reversed phase with respect thereto.

3. A circuit according to claim 1, wherein said stabilising means comprise means for connecting the input of said selecting means to a point of fixed potential during said rest periods.

4. A circuit for developing electric signals dependent upon the sense of electric pulses comprising an integrating circuit having a time constant longer than the duration of any of said pulses, means to apply said pulses to the input of said integrating circuit, a generator of gating pulses of a duration which is shorter than that of the first-named pulses and which is only a small fraction of the recurrence period of said first named pulses and having a substantially constant voltage level between said gating pulses, a gate circuit, means for applying the output of said integrating circuit to said gate circuit, means to apply said substantially constant voltage level to maintain the output of said integrating circuit at a substantially fixed amplitude and means to apply said gating pulses to said gate circuit to open said gate circuit for the durations of said gating pulses.

5. A circuit for developing electric signals dependent upon the sense of electric pulses comprising an integrating circuit having a time constant longer than the duration of any of said pulses, means to apply said pulses to the input of said integrating circuit, amplifier means coupled to the output of said integrating circuit, stabilizing means maintaining the resting level of said amplifier means at a predetermined value, and means selecting predetermined portions of the output of said amplifier, said predetermined portions being of lesser duration than that of any of said electric pulses.

6. The circuit of claim 5 in which the output of said integrating means comprises an unbalanced waveform, said stabilizing means including means converting said unbalanced waveform to a balanced waveform.

7. The circuit of claim 5 in which said means selecting predetermined portions of said amplifier output includes means selecting only portions of one predetermined sense.

8. The circuit of claim 5 in which said means selecting predetermined portions of said amplifier output includes gating means.

9. The circuit of claim 8 including means producing gating pulses, of lesser duration than that of any of said electric pulses, coupled to said gating means.

10. The circuit of claim 9 in which said stabilizing means includes clamp means periodically releasing the output of said amplifier means, said means producing gating pulses being also coupled to said clamp means.

11. A digital storage system comprising a cathode ray tube having electron beam producing means, an electric charge-retaining storage screen storing different digits in the form of different charge conditions on discrete areas of said screen, deflecting means for deflecting said electron beam over said screen, electron beam-control means, and a signal plate coupled to said storage screen, a bright-up pulse generator, means applying bright-up pulses from said generator to said beam-control means to switch said beam on one of said discrete areas for a predetermined period and switch it off, thereby generating in said signal plate a signal pulse representative of the charge condition on said one discrete area, an integrating circuit having a time constant longer than the duration of one of said bright-up pulses, means applying said pulse signal to the input of said integrating circuit, a gate circuit having two input terminals and an output terminal, a gate pulse generator generating gate pulses of duration less than that of said bright-up pulses, means applying the output of said integrating circuit to one of the input terminals of said gate circuit, and means applying said gate pulses to the other input terminal of said gate circuit, said gate circuit serving to pass to the output terminal thereof only the part of the output of said integrating circuit occurring during one of said gate pulses.

12. A digital storage system according to claim 11, wherein said gate pulses are timed to co-exist with substantially the maximum amplitude of the output of said integrating circuit.

References Cited in the file of this patent

UNITED STATES PATENTS

| | | |
|---|---|---|
| 1,315,539 | Carson | Sept. 9, 1919 |
| 2,398,490 | Atwood | Apr. 16, 1946 |
| 2,458,599 | Hussey | Jan. 11, 1949 |
| 2,484,352 | Miller et al. | Oct. 11, 1949 |
| 2,493,648 | Watton et al. | Jan. 3, 1950 |
| 2,497,693 | Shea | Feb. 14, 1950 |
| 2,534,264 | Hoeppner | Dec. 19, 1950 |
| 2,538,028 | Mozley | Jan. 16, 1951 |
| 2,576,552 | Wittenberg | Nov. 27, 1951 |